(12) United States Patent
Park et al.

(10) Patent No.: US 7,821,692 B2
(45) Date of Patent: Oct. 26, 2010

(54) METHOD OF AND APPARATUS FOR RECORDING/REPRODUCING DATA ON/FROM HOLOGRAPHIC STORAGE MEDIUM

(75) Inventors: Hyun-soo Park, Seoul (KR); Jin-Han Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 579 days.

(21) Appl. No.: 11/752,603

(22) Filed: May 23, 2007

(65) Prior Publication Data

US 2008/0204837 A1    Aug. 28, 2008

(30) Foreign Application Priority Data

Jan. 26, 2007    (KR) .................. 10-2007-0008599

(51) Int. Cl.
*G03H 1/26* (2006.01)
(52) U.S. Cl. .................. 359/22; 359/21
(58) Field of Classification Search .............. 359/1, 359/21, 22
See application file for complete search history.

(56) References Cited

U.S. PATENT DOCUMENTS

| 5,808,998 | A | 9/1998 | Curtis et al. |
| 6,222,754 | B1 | 4/2001 | Goto et al. |
| 2005/0240856 | A1 | 10/2005 | Hayashi |
| 2006/0203689 | A1 | 9/2006 | Kanaoka et al. |
| 2007/0047042 | A1* | 3/2007 | Noguchi .................. 359/24 |

FOREIGN PATENT DOCUMENTS

| EP | 1 551 011 | 7/2005 |
| KR | 2006-61671 | 6/2006 |
| WO | WO 2004/034387 | 4/2004 |
| WO | WO 2005/006317 | 1/2005 |

OTHER PUBLICATIONS

Hesselink, Orlov and Bashaw, "Holographic Data Storage Systems" Proceedings of the IEEE, vol. 92, No. 8, (Aug. 2004), pp. 1231-1280.*
International Search Report dated Jan. 16, 2008 of the PCT International Application No. PCT/KR2007/005068.
John F. Heanue et al, "Volume Holographic Storage and Retrieval of Digital Data," *Science*, Aug. 1994, vol. 265 No. 5173, American Association for the Advancement of Science, Washington, D.C., USA, pp. 749-752.
European Search Report issued on Feb. 19, 2010, in corresponding European Application No. 07833377.0 (3 pages).

* cited by examiner

*Primary Examiner*—Alessandro Amari
(74) *Attorney, Agent, or Firm*—NSIP Law

(57) ABSTRACT

A method of and apparatus for recording/reproducing data on/from a holographic storage medium. The method of recording data on a holographic storage medium in which holograms containing data by interference between a signal light and a reference light are recorded in pages includes modulating additional information including information about a page so as to keep the rate of 0s or 1s in binarized data of the additional information constant and recording the page having the modulated additional information added thereto on the holographic storage medium.

19 Claims, 3 Drawing Sheets

FIG. 1A
(PRIOR ART)
FIG. 1B
(PRIOR ART)
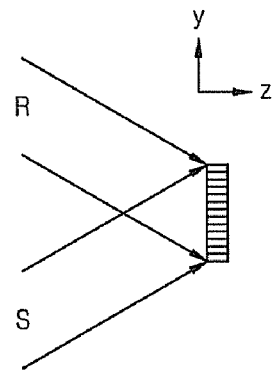
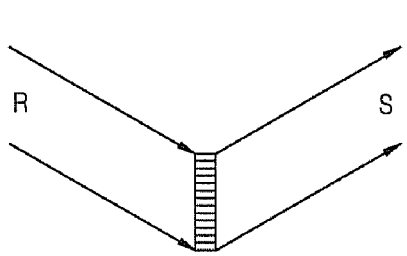
FIG. 2
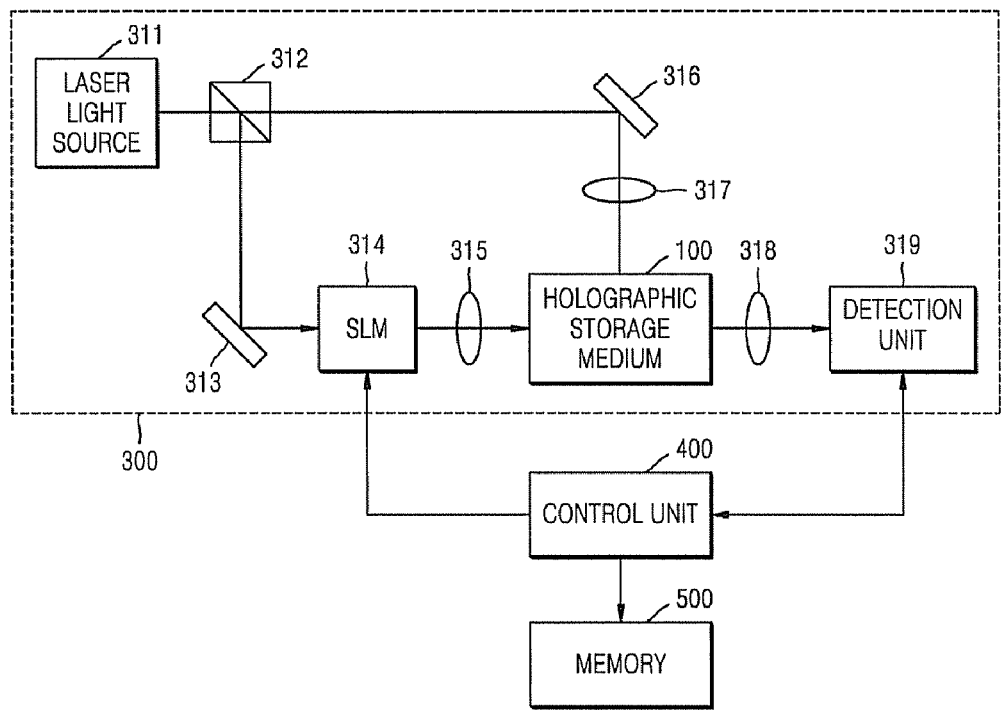

METHOD OF AND APPARATUS FOR RECORDING/REPRODUCING DATA ON/FROM HOLOGRAPHIC STORAGE MEDIUM

CROSS-REFERENCE TO RELATED APPLICATIONS

This application claims the benefit of Korean Patent Application No. 2007-8599, filed in the Korean Intellectual Property Office on Jan. 26, 2007, the disclosure of which is incorporated herein by reference.

BACKGROUND OF THE INVENTION

1. Field of the Invention

Aspects of the present invention relate to a method of and apparatus for recording/reproducing data on/from a holographic storage medium.

2. Description of the Related Art

In optical holography, data is stored within the volume of a recording medium instead of on the surface of the recording medium. Light carrying a signal interferes with reference light in the recording medium, thus generating an interference grating called a data page. A plurality of overlapping gratings can be recorded in the same volume by changing the optical characteristics of the reference light. Such a process is called multiplexing. In a data read operation, a single reference light is incident to the recording medium in the same condition as in a data write operation in order to generate diffracted light indicating a stored data page. The diffracted light is detected by a detection array that extracts stored data bits from a measured intensity pattern. The data page contains a number of data bits or pixels. The data storage capacity of the recording medium may increase by overlapping a plurality of data pages in the same volume of the recording medium. Holograms are recorded using a signal light including data and the reference light.

FIGS. 1A and 1B are reference diagrams explaining a recording operation and a reproducing operation in optical holography according to the prior art. In the recording operation illustrated in FIG. 1A, reference light R and signal light S interfere with each other and generate an interference pattern. The generated interference pattern is delivered to a recording medium. In the reproducing operation illustrated in FIG. 1B, reference light R irradiated to holograms recorded on the recording medium causes diffraction of the holograms, thereby generating output signal light S.

Recording on a holographic storage medium is performed by interference between the signal light and the reference light. The signal light is generated by a spatial light modulator in the form of a page composed of a plurality of pixels. The generated signal light interferes with the reference light on the holographic storage medium after passing through an optical system. An interference pattern generated in this way is recorded on the holographic storage medium. For reproduction, the reference light is incident to the recorded interference pattern and causes diffraction of the recorded signal light.

In hologram recording, the strength and phase of the signal light can be recorded in various ways, such as by changing the angle of reference light. Several hundreds to several thousands of holograms can be recorded in the same position in pages composed of binary data. The page can express information of a pixel with 'on' or 'off'.

To record binary data on a holographic storage medium, a spatial light modulator generates binary data. A detector implemented with a Charge Coupled Device (CCD) or a Complementary Metal-Oxide-Semiconductor (CMOS) receives strength distribution with respect to light intensity in a binary data format, moves binary data to a corresponding position of the original page, and reads the binary data from the position.

If noise is generated when the spatial light modulator generates binary data or reproduces page data, data of the original page or the shape of the original page may be changed due to the noise, making the original data difficult to read. In particular, if additional information containing address information or modulation information of page data has an error due to noise, accuracy at which the detector reads the original data using the additional information may be degraded.

SUMMARY OF THE INVENTION

Aspects of the present invention provide a method of and apparatus for recording/reproducing data on/from a holographic storage medium, in which an error of additional information for a page recorded on the holographic storage medium is reduced and data can be easily detected.

According to one aspect of the present invention, a method of recording data on a holographic storage medium in which holograms containing data by interference between signal light and reference light are recorded in units of pages is provided. The method includes modulating additional information including information about a page so as to keep the rate of 0s or 1s in binarized data of the additional information constant and recording the page having the modulated additional information added thereto on the holographic storage medium.

According to another aspect of the present invention, the method may include comparing the run length of consecutive 0s or 1s in the modulated additional information with a threshold.

According to another aspect of the present invention, the method may include re-modulating the modulated additional information in order to reduce the run length of consecutive 0s or 1s to less than the threshold if the run length of consecutive 0s or 1s in the modulated additional information exceeds the threshold.

According to another aspect of the present invention, the modulating of the additional information comprises modulating zeroes (0s) in the binarized data of the additional information to 00 or 11 and modulating ones (1s) in the binarized data of the additional information to 10 or 01.

According to another aspect of the present invention, the modulating of the additional information comprises modulating either all of the 0s or all of the 1s in the binarized data of the additional information to 01 and modulating the other to 10.

According to another aspect of the present invention, a plurality of additional information is attached around the page and at least two of the plurality of additional information are modulated to the same data.

According to another aspect of the present invention, the additional information may be expressed as a bar code.

According to another aspect of the present invention, the additional information may indicate at least one of data information and address information of the page, angle information of the signal light or the reference light, and book information of the page.

According to another aspect of the present invention, a method of reproducing data from a holographic storage medium in which holograms containing data by interference between signal light and reference light are recorded in pages is provided. The method includes reading additional information stored in the holographic storage medium, the additional information containing information about a page using the reference light and performing slicing on binarized data of the additional information using a slice level and adjusting the slice level so that the rate of first data higher than the slice level or second data lower than the slice level is equal to a first value.

According to another aspect of the present invention, the additional information may be recorded on the holographic storage medium after the additional information is binarized in such a way that the rate of 1s or 0s is equal to the first value.

According to another aspect of the present invention, the run length of consecutive 0s or 1s in the recorded additional information may be less than a threshold.

According to another aspect of the present invention, the first data may be recognized as 1, the second data may be recognized as 0, and align marks of the page may be detected from distribution information of 1s and 0s.

According to another aspect of the present invention, an apparatus to record data on a holographic storage medium in which holograms containing data by interference between a signal light and a reference light are recorded in units of pages is provided. The apparatus includes a light processing unit to record data on the holographic storage medium using the signal light and the reference light and a control unit to modulate additional information including information about a page to keep the rate of 0s or 1s in binarized data of the additional information constant and to record the page having the modulated additional information added thereto on the holographic storage medium.

According to another aspect of the present invention, an apparatus to reproduce data from a holographic storage medium in which holograms containing data by interference between a signal light and a reference light are recorded in units of pages is provided. The apparatus includes a light processing unit to read additional information stored in the holographic storage medium, the additional information containing information about a page using the reference light and a control unit to perform slicing on binarized data of the additional information using a slice level and to adjust the slice level so that the rate of first data higher than the slice level or second data lower than the slice level is equal to a first value.

According to another aspect of the present invention, a holographic storage medium is provided, in which holograms containing data by interference between a signal light and a reference light are recorded pages, in which binarized data of additional information containing information about a page is recorded while the rate of 0s or 1s in the binarized data is kept constant.

According to another aspect of the present invention, a computer-readable recording medium is provided, the computer-readable recording medium having recorded thereon a program to implement the method of recording data on a holographic storage medium in which holograms containing data by interference between a signal light and a reference light are recorded in units of pages or the method of reproducing data from a holographic storage medium in which holograms containing data by interference between a signal light and a reference light are recorded in pages.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 1A and 1B are reference diagrams explaining a recording operation and a reproducing operation in optical holography according to the prior art;

FIG. 2 is a block diagram of an apparatus to record/reproduce data on/from a holographic storage medium according to an embodiment of the present invention;

DETAILED DESCRIPTION OF THE EMBODIMENTS

Figure 3:
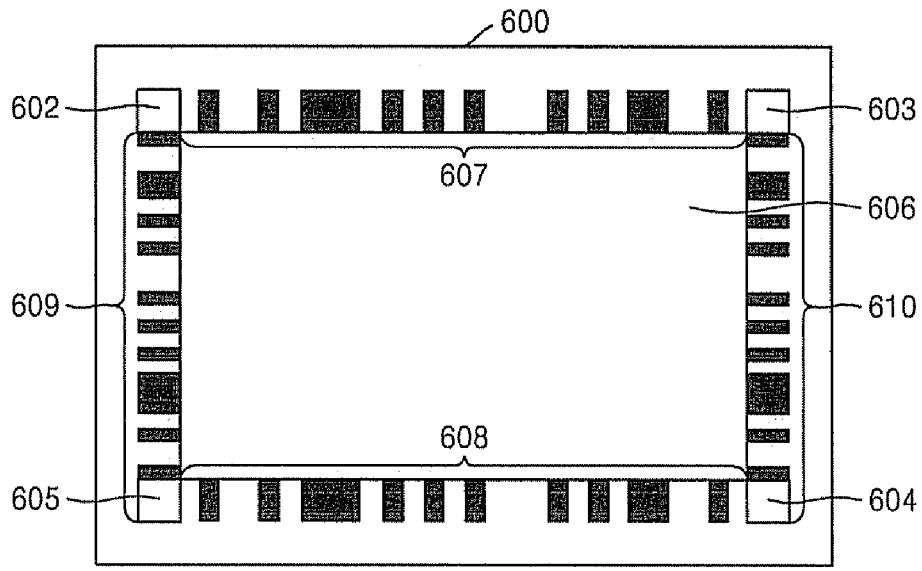
FIG. 3 illustrates an original page according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 2 is a block diagram of an apparatus to record/reproduce data on/from a holographic storage medium according to an embodiment of the present invention. The apparatus includes a light processing unit 300 in which a holographic storage medium 100 is loaded, a control unit 400 that controls the light processing unit 300 to record data on or reproduce data from the holographic storage medium 100, and a memory 500 that temporarily stores data that has been read from or is to be recorded on the holographic storage medium 100. The light processing unit 300 includes a laser light source 311, a beam splitter 312, a first reflection mirror 313, a spatial light modulator (SLM) 314, a first lens 315, a second reflection mirror 316, a second lens 317, a third lens 318, and a detection unit 319.

The control unit 400 controls the light processing unit 300, generates page data including recording data, transmits the page data to the light processing unit 300, and performs data processing on a signal reproduced from the light processing unit 300. The control unit 400 keeps the rate of 0s or 1s in additional information 607, 608, 609, and 610 included in a page 600 (shown in FIG. 3) to be recorded in the holographic storage medium 100 constant, thereby facilitating the read operation of the detection unit 319.

A process in which the control unit 400 modulates additional information of data recorded on the holographic storage medium 100 will be described. FIG. 3 illustrates a data page 600 according to an embodiment of the present invention. The data page 600 includes four page align marks 602, 603, 604, and 605; page data 606; and additional information 607, 608, 609, and 610. The original page 600 indicates the entire area of the SLM 314 for recording. The page data 606 indicates an interference pattern generated by the signal light and the reference light and is composed of on/off pixels in which light transmission is expressed with '1' and light blocking is expressed with '0'.

The page align marks 602, 603, 604, and 605 are positioned at four corners of the page data 606 to allow the detection unit 319 to accurately recognize the position of the page data 606. The page align marks 602, 603, 604, and 605 are used to correct the position of a page and a page detected by the detection unit 319 is turned to a predetermined position based on the page align marks 602, 603, 604, and 605.

The additional information 607, 608, 609, and 610 are positioned in four sides of the page data 606 and indicate modulation information and address information of the page data 606, angle information of signal light or reference light, and book information of the page data 606. The additional information 607, 608, 609, and 610 according to other aspects of the invention may be positioned in any one side or two sides of the page data 606 or may have various positions and shapes.

The additional information 607, 608, 609, and 610 including address information functions as follows. When data in a specific position is read from the holographic storage medium 100, if an error is generated in address information of the data due to noise, an accurate address position can be found based on the current address position using the additional information 607-610. Desired data can be read using the additional information 607-610 without a need to detect all page data in the holographic storage medium 100.

As illustrated in FIG. 3, the additional information 607, 608, 609, and 610 according to an embodiment of the present invention can be expressed as a bar code composed of 0 and 1. 0 and 1 can be expressed with the black color and the white color like a bar code, in which 0 is expressed with the block color and 1 is expressed with the white color. The 0 and 1 bits may be in a square shape, like a bar code.

A process of recording data on and reproducing recorded data from the holographic storage medium 100 will be described. When data is recorded on the holographic storage medium 100, laser light having coherency and output from the laser light source 311 is incident to the beam splitter 312 and is split into the reference light and the signal light. The signal light including recording data is incident to the SLM 314 and undergoes spatial light modulation (amplitude modulation). The modulated signal light is condensed to the holographic storage medium 100 by the first lens 315. The reference light is reflected by the second reflection mirror 316 and is irradiated to the holographic storage medium 100 by the second lens 317. An interference pattern formed by the overlapping of the signal light and the reference light is recorded as a fine rarefaction pattern on the holographic storage medium 100.

To reproduce data recorded on the holographic storage medium 100, the same illumination light as the reference light used in recording the data page 600 to be reproduced is incident to the holographic storage medium 100 and data is reproduced as diffracted light corresponding to an interference pattern recorded on the holographic storage medium 100. The diffracted light is condensed by the third lens 318 to the detection unit 319 implemented with a Charge Coupled Device (CCD) or a Complementary Metal-Oxide-Semiconductor (CMOS). A reproduction signal output from the detection unit 319 is transmitted to the control unit 400.

Figure 4:
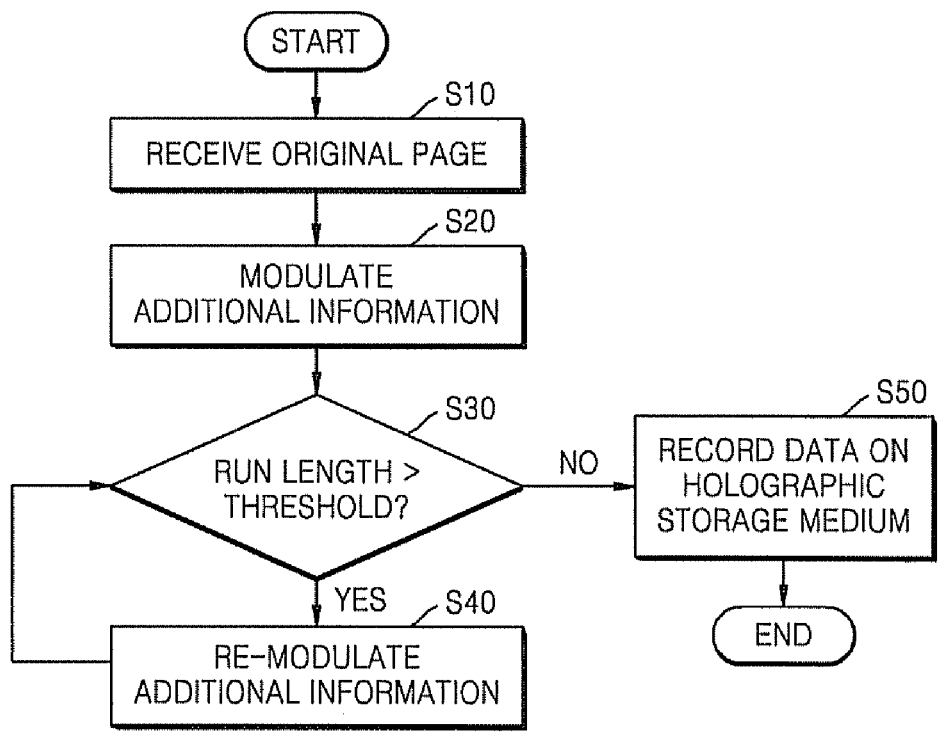
FIG. 4 is a flowchart of a process in which a control unit changes additional information according to an embodiment of the present invention.

The control unit 400 allows the detection unit 319 to easily detect page data by modulating the additional information 607, 608, 609, and 610 as follows. FIG. 4 is a flowchart of a process in which the control unit 400 changes the additional information 607, 608, 609, and 610 according to an embodiment of the present invention. Once the original page is input from outside in operation S10, the control unit 400 keeps the rate of 0s or 1s constant by modulating a bit of additional information in operation S20.

Figures 5, 6:
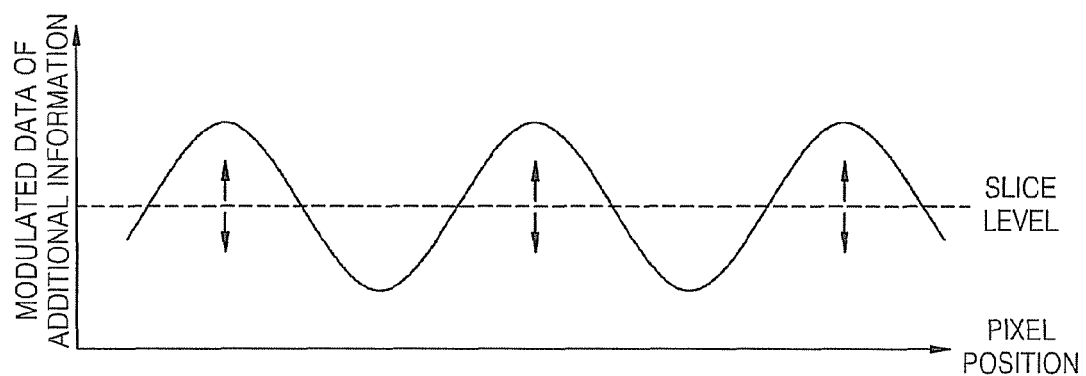
FIG. 5 illustrates additional information before modulation by the control unit and additional information after modulation by the control unit according to an embodiment of the present invention.
FIG. 6 is a view explaining a process in which the control unit slices the modulated additional information according to an embodiment of the present invention.

If a bit of input additional information 607-610 is 0, the control unit 400 modulates the bit to 2 bits of 00 or 11. If a bit of input additional information is 1, the control unit 400 modulates the bit to 2 bits of 10 or 01. As illustrated in FIG. 5, if a previously input bit 0 is modulated to 00, a next input bit 0 may be modulated to 11. If there are many 0s in the modulated data, the bit 0 of the original additional information may be modulated to 11. If there are many 1s in the modulated data, the bit 0 of the original additional information may be modulated to 00. In this way, the control unit 400 keeps the rate of 0s or 1s constant.

FIG. 5 illustrates the additional information 607-610 before modulation by the control unit 400 and the additional information 607-610 after modulation by the control unit 400 according to an embodiment of the present invention. In FIG. 5, the control unit 400 modulates the additional information to maintain the rate of 0s or 1s at 50%; however, the control unit 400 according to other aspects of the invention may modulate the additional information 607-610 to maintain the rate of 0s and 1s at any percentage. The control unit 400 modulates the bit 0 of the additional information to 00 or 11 and the bit 1 of the additional information to 01 or 10.

Referring back to FIG. 4, the control unit 400 determines whether the run length of consecutive 0s or 1s in the modulated additional information exceeds a threshold in operation S30. If so, the control unit 400 re-modulates the modulated additional information in operation S40. If the run length of consecutive 0s in the modulated additional information exceeds the threshold, the control unit 400 re-modulates the modulated additional information so as to reduce the run length of consecutive 0s to less than the threshold. For example, the control unit 400 re-modulates the bit 0 of the modulated additional information to 11, instead of 00, to prevent the generation of consecutive 0s, and re-modulates the next bit 0 of the modulated additional information to 00, instead of 11, thereby keeping the rate of 0s or 1s constant.

If there are consecutive 0s in the modulated additional information, the control unit 400 re-modulates the next bit 1 of the modulated additional information to 10 instead of 01, thereby reducing the run length of consecutive 0s. The control unit 400 may also reduce the run length of consecutive 0s by re-modulating the previous bit 1 of the modulated additional information to 01 instead of 10.

Likewise, if the modulated additional information includes consecutive 1s whose run length exceeds the threshold, the control unit 400 performs re-modulation to reduce the run length of consecutive 1s to less than the threshold. For example, the control unit 400 re-modulates the bit 0 of the modulated additional information to 00 instead of 11, thereby preventing the generation of consecutive 1s. The threshold is a value that allows the detection unit 319 to read the modulated additional information and can be experimentally determined.

If the run length of consecutive 0s or 1s in the modulated additional information is less than the threshold, the control unit 400 controls the SLM 314 to record the modulated additional information to the holographic storage medium 100 in operation S50. If there are consecutive 0s or 1s in the modulated additional information, the detection unit 319 may not accurately detect the start and end of the additional information 607-610 and may determine that no data is recorded in the additional information 607-610 if the modulated additional information is composed of all 0s. Therefore, the control unit 400 prevents the generation of excessive consecutive 0s or 1s in the modulated additional information.

Although the bit 0 of the input additional information 607-610 is modulated to 2 bits of 00 or 11 and the bit 1 of the input additional information 607-610 is modulated to 2 bits of 10 or 01, according to other aspects of the invention, the 0 bits of the input additional information may also be modulated to 2 bits of 01 and the 1 bits of the input additional information may also be modulated to 2 bits of 10. The 0 bits of the input additional information may also be modulated to 2 bits of 10 and the 1 bits of the input additional information may also be modulated to 2 bits of 01. For example, every 0 bit in the input additional information may be modulated to 10 and every 1 bit in the input additional information may be modulated to 01.

According to another embodiment of the present invention, data of the additional information 607 and data of the additional information 608 may be modulated to the same value. Similarly, data of the additional information 609 and data of the additional information 610 may be modulated to the same value, thereby allowing the detection unit 319 to stably read address information or page information even when any of the additional information 607-610 has an error. Stable decoding is possible using a slice level when much noise is introduced during a process of recording data on or reproducing recorded data from the holographic storage medium 100.

FIG. 6 is a view explaining a process in which the control unit 400 slices the modulated additional information according to an embodiment of the present invention. When modulated additional information is recorded on the holographic storage medium 100 using the process illustrated in FIG. 4 to reproduce the data recorded on the holographic storage medium 100, the control unit 400 varies a slice level for a quantized value of the modulated additional information to distinguish 0s and 1s in the modulated additional information and the detection unit 319 reads the detected data from the holographic storage medium 100. The detection unit 319 recognizes a quantized value of the modulated additional information that is higher than a slice level as 1 and recognizes a quantized value of the modulated additional information that is lower than the slice level as 0. The control unit 400 adjusts the slice level in order to make the rate of 0s or 1s equal to the rate of 0s or 1s in the additional information modulated by the control unit 400.

The control unit 400 varies the slice level in order to detect a matching point between the rate of 0s or 1s during the recording of the additional information and the rate of 0s or 1s during the reproduction of the additional information and identifies 0 and 1 in the additional information based on the detected slice level. The detection unit 319 does not need to read the entire page and reads only the quantized value of the additional information. Based on the result of distinguishing 0s and 1s, distribution information of 1s and 0s over the entire page can be obtained. The detection unit 319 can accurately recognize the page align marks 602, 603, 604, and 605 based on the distribution information.

According to aspects of the present invention, the control unit 400 keeps the rate of data in the additional information 607, 608, 609, and 610 constant and modulates the additional information 607, 608, 609, and 610 so as to prevent the run length of consecutive 0s or 1s from exceeding the threshold, thereby allowing the detection unit 319 to accurately reproduce the entire page data using a slice level to reproduce data recorded on the holographic storage medium 100. 0s and 1s are distinguished using a predetermined slice level even when the rate of 0s or 1s changes due to a noise-caused error in additional data according to the prior art. According to aspects of the present invention, a slice level is determined according to the rate of 0s or 1s, thereby reducing a bit error rate in spite of noise.

According to aspects of the present invention, by keeping the rate of data in additional information of a page constant and limiting the run length of data, the page can be easily read to reproduce data recorded on the holographic storage medium.

Error reduction and modulation techniques according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like; and a computer data signal embodied in a carrier wave comprising a compression source code segment and an encryption source code segment (such as data transmission through the Internet). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of recording data on a holographic storage medium in which holograms containing data by interference between a signal light and a reference light are recorded in pages, the method comprising:
    modulating additional information including comprising information about a page so as to keep the rate of 0s or 1s in binarized data of the additional information constant;
    recording the page comprising the modulated additional information added thereto on the holographic storage medium;
    comparing the run length of consecutive 0s or 1s in the modulated additional information with a threshold; and
    re-modulating the modulated additional information in order to reduce the run length of consecutive 0s or 1s to less than the threshold if the run length of consecutive 0s or 1s in the modulated additional information exceeds the threshold.

2. The method of claim 1, wherein a plurality of additional information is attached around the page and at least two of the plurality of additional information are modulated to the same data.

3. The method of claim 1, wherein the additional information is expressed as a bar code.

4. The method of claim 1, wherein the additional information indicates at least one of data information and address information of the page, angle information of the signal light or the reference light, and book information of the page.

5. A computer-readable recording medium having recorded thereon a program to implement the method of claim 1.

6. The method of claim 1, wherein the re-modulating comprises remodulating a 1 bit to 10 to reduce the length of consecutive 0s.

7. The method of claim 1, wherein the re-modulating comprises remodulating a 0 bit to 11 to reduce the length of consecutive 0s.

8. The method of claim 1, wherein the re-modulating comprises re-modulating a 1 bit to 01 to reduce the length of consecutive 1s.

9. The method of claim 1, wherein the re-modulating comprises remodulating a 0 bit to 00 to reduce the length of consecutive 1s.

10. A method of recording data on a holographic storage medium in which holograms containing data by interference between a signal light and a reference light are recorded in pages, the method comprising:
modulating additional information comprising information about a page so as to keep the rate of 0s or 1s in binarized data of the additional information constant;
recording the page comprising the modulated additional information added thereto on the holographic storage medium,
wherein the modulating of the additional information comprises modulating zeroes (0s) in the binarized data of the additional information to 00 or 11 and modulating ones (1s) in the binarized data of the additional information to 10 or 01.

11. A method of recording data on a holographic storage medium in which holograms containing data by interference between a signal light and a reference light are recorded in pages, the method comprising:
modulating additional information comprising information about a page so as to keep the rate of 0s or 1s in binarized data of the additional information constant;
recording the page comprising the modulated additional information added thereto on the holographic storage medium,
wherein the modulating of the additional information comprises modulating either the 0s or the 1s in the binarized data to 01 and modulating the other to 10.

12. An apparatus to record data on a holographic storage medium in which holograms containing data by interference between a signal light and a reference light are recorded in pages, the apparatus comprising:
a light processing unit configured to record data on the holographic storage medium using the signal light and the reference light; and
a control unit configured to:
modulate additional information comprising information about a page to keep the rate of 0s or 1s in binarized data of the additional information constant and to record the page having the modulated additional information added thereto on the holographic storage medium;
compare the run length of consecutive 0s or 1s in the modulated additional information with a threshold; and
re-modulate the modulated additional information in order to reduce the run length of consecutive 0s or 1s to less than the threshold if the run length of consecutive 0s or 1s in the modulated additional information exceeds the threshold.

13. The apparatus of claim 12, wherein the control unit is further configured to modulate 0 in the binarized data of the additional information to 00 or 11 and modulates 1 in the binarized data of the additional information to 10 or 01.

14. The apparatus of claim 12, wherein the control unit is further configured to modulate either the 0s or the is in the binarized data of the additional information to 01 and modulates the other to 10.

15. The apparatus of claim 12, wherein a plurality of additional information is attached around the page and the control unit modulates at least two of the plurality of additional information to the same data.

16. The apparatus of claim 12, wherein the additional information is expressed as a bar code.

17. The apparatus of claim 12, wherein the additional information indicates at least one of data information and address information of the page, angle information of the signal light or the reference light, and book information of the page.

18. A holographic storage medium in which holograms containing data by interference between a signal light and a reference light are recorded in pages,
wherein binarized data of additional information containing information about a page is recorded while the rate of 0s or 1s in the binarized data is kept constant, and
wherein the run length of consecutive 0s or 1s in the recorded additional information is less than a threshold.

19. The holographic storage medium according to claim 18, wherein the additional information allows a holographic storage medium reproducing apparatus to read a portion of data from the page without reading all the data from the page.

* * * * *